United States Patent [19]

Zuidema

[11] 4,036,520
[45] July 19, 1977

[54] COMBINATION RECREATIONAL VEHICLE ATTACHMENT

[76] Inventor: Samuel J. Zuidema, 87 Bearfoot Road, West Milford, N.J. 07480

[21] Appl. No.: 685,032

[22] Filed: May 10, 1976

[51] Int. Cl.² .............................................. B60D 3/10
[52] U.S. Cl. ...................................... 296/23 B; 9/1.1; 214/450; 224/42.1 R; 224/42.42 R
[58] Field of Search ................ 296/23 B; 224/42.1 E, 224/42.1 D, 42.1 R, 42.42 R; 214/450; 9/1.1, 1.2; 135/1 A, 5 A, 6

[56] References Cited

U.S. PATENT DOCUMENTS

| 3,473,839 | 10/1969 | Elble | 9/1.1 |
| 3,539,219 | 11/1970 | Mueller | 296/23 B |
| 3,933,112 | 1/1976 | Veazey | 9/1.1 |
| 3,955,731 | 5/1976 | Lindelef | 224/42.1 E |

*Primary Examiner*—Robert R. Song
*Assistant Examiner*—John A. Carroll
*Attorney, Agent, or Firm*—James J. Cannon, Jr.; James J. Cannon

[57] ABSTRACT

A recreational vehicle body attachment to form a combination roof-top and detachable boat particularly adapted to van-type vehicles but also adaptable to pick-up truck vehicles, with or without camper caps, station wagons and pull type trailers, all of said vehicles and trailers having their original roof-tops removed. The detachable boat-roof structure, dimensioned to cover the vehicle roof area, rests upon a wedging supporting lip which continuously extends about and rests upon a remaining perimeter strip of the original roof, is secured by a latch and is removable by rearwardly positioned rollers, the latches and rollers being secured to the inner surface of said support lip. The roof-tops and body further have provisions for the erection of a tent structure to provide an enclosure for the vehicle when the boat-roof structure is removed.

17 Claims, 8 Drawing Figures

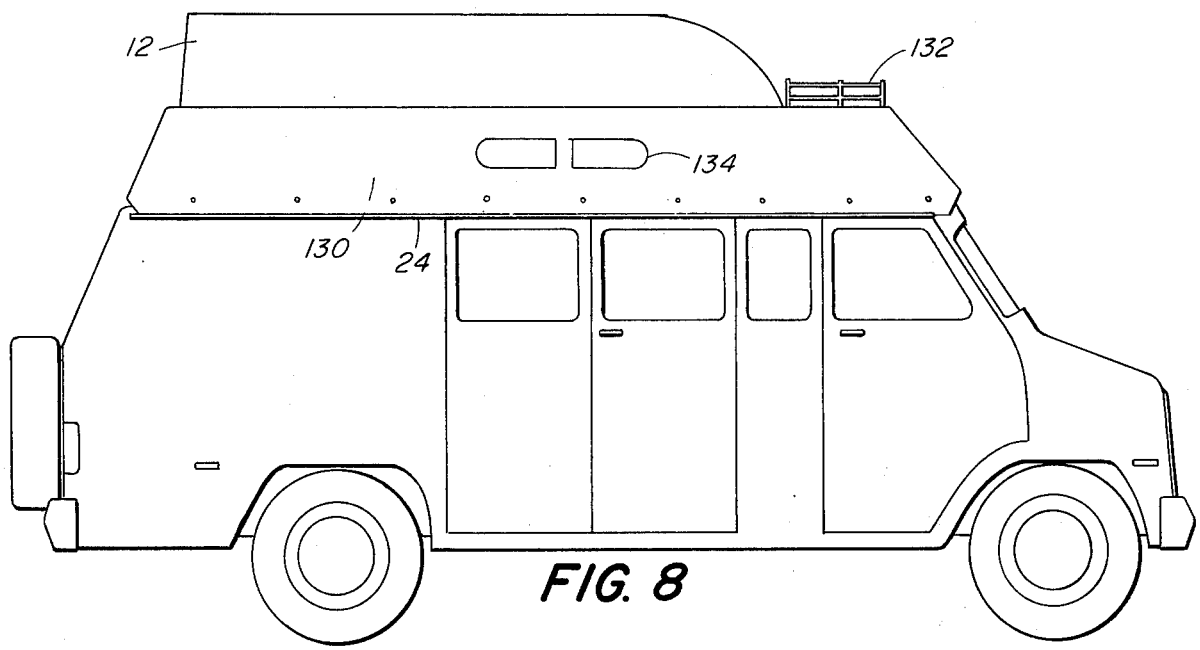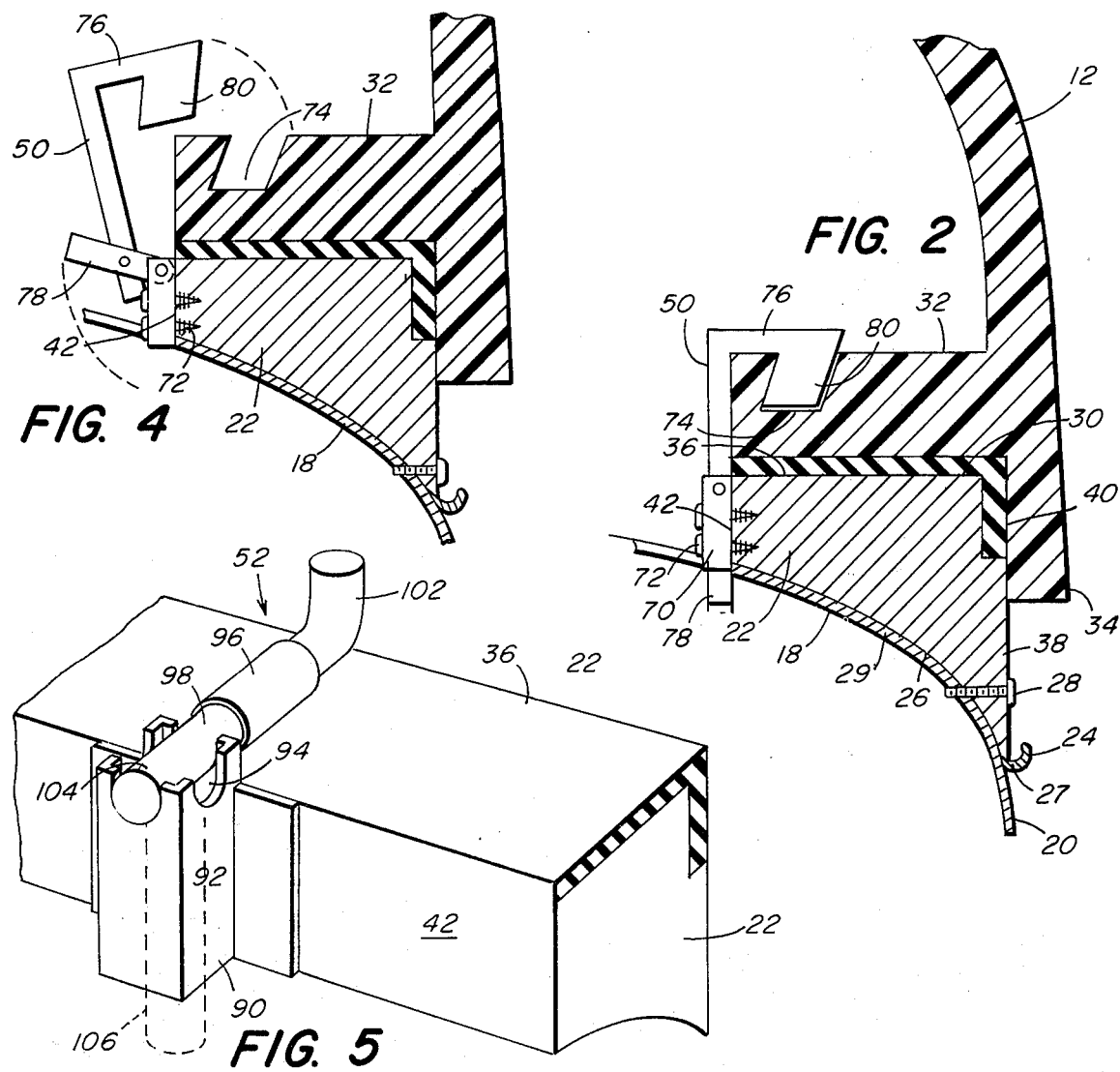

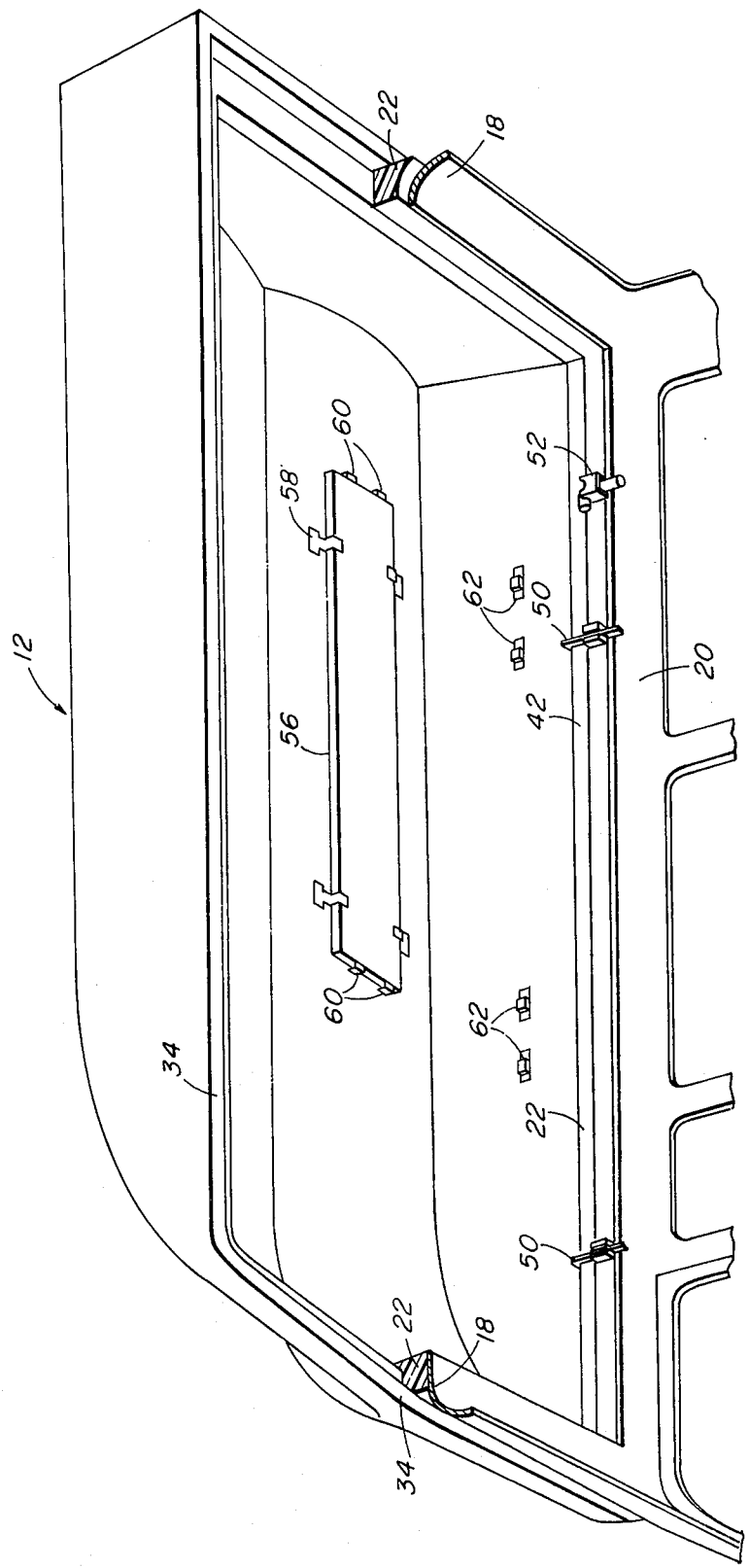

COMBINATION RECREATIONAL VEHICLE ATTACHMENT

BACKGROUND OF THE INVENTION

The present invention relates to bodies, body attachments and tops for land vehicles and particularly to vehicles adapted for liveability and for transporting and carrying boat structures in place of and out of the plane of a normal fixed roof section, the boat structure fulfilling the normal roof function. The invention further relates to mounting and demounting of the boat from the vehicle and the installation of a demountable tent top and cover in place of the boat-roof.

DESCRIPTION OF THE PRIOR ART

Recreational vehicles, particularly van-type vehicles having customized sleeping compartment interiors, have been gaining commercial acceptance for various multipurpose consumer uses. Among the more prevalent utilizations are by those who wish to use the vehicle for his everyday affairs and who also wish to have many conveniences while camping without having to purchase another special purpose vehicle. The present invention seeks to further increase the versatility of such vehicles by substituting in place of the conventional roof, a removable roof enclosure which may be simply constructed and easily demounted for use as a boat.

Various roof-tops which lie out of the plane of a conventional roof have been supplied for van-type vehicles to provide added living space within the vehicle. For example, a common adaptation is to fixably secure, in place of the conventional roof, a roof usually made of fiberglass substances which is raised out of the plane of the original roof by two to three feet. As compared to the present invention, these embodiments necessitate the towing of a boat since it would be impractical to place a boat on top of these structures. Prime considerations of such constructions are weight and wind resistance. Other modifications include the so-called "pop tops" whereby a portion of the roof may be latched and raised upon hinged supports. The space between the vehicle top and the raised top is then enclosed by canvas. These constructions provide added living space but do not provide the dual advantages of the present invention.

U.S. Pat. No. 1,467,051 disclosed a top and side panels of a vintage car, formed of watertight materials, which can be removed and inverted to form a boat although the claims are not directed thereto. U.S. Pat. No. 3,593,219 further discloses a boat-tent-vehicle combination, the tent being erectable upon the roof of a car as does U.S. Pat. No. 2,817,852. These disclosures, however, do not form the roof of the vehicle. Most closely related to the present invention is U.S. Pat. No. 3,473,839 which discloses a boat-houseboat-sleeping compartment combination for a pick-up truck vehicle, the boat being capable of being the roof for the sleeping compartment. The boat, however, is not replacing the function of the original roof as is the present invention. U.S. Pat. No. 3,324,487 simply illustrates the placement of a boat upon a vehicle top.

The present invention may be distinguished since none of the prior art disclosures illustrate the boat and tent as being an integral part of the roof of a vehicle and being a suitable replacement therefore. The present invention represents a unique boat-tent-vehicle combination of a simplified construction which is an improvement over prior conceptions and which is easily adaptable to various uses with a minimum of effort. The necessity of towing a boat by trailer is eliminated. Problems of removal of a boat from the roof of a vehicle, which are readily apparent from the disclosure of U.S. Pat. No. 3,473,839, have been minimized as will be apparent from the following disclosure Furthermore, the boat-roof structure is readily adaptable to existing vehicles with minimal cost, the unique combination providing savings to consumers due to its multipurpose aspects.

SUMMARY OF THE INVENTION

The present invention, adaptable primarily to van-type vehicles but also adaptable to pick-up trucks and pull type trailers, is characterized by a removable boat-like roof-top, in place of and raised out of the plane of the original roof, and a tent-structure erectable when the boat has been removed for use. The inventor seeks to maximize the purpose of usage of recreational vehicles by providing a weather tight roof fitted to the vehicle which provides added space within the vehicle and which provides the added advantage of being usable as a boat. The present invention may be constructed at a price on a par with conventional raised rood vehicle attachments. The invention is further designed such that one or two persons may easily remove the boat without tools and thereafter erect a simple tent covering for the roof of the vehicle.

The boat may be constructed of fiberglass, metal, or other materials of comparable strength and durability. Preferably the boat has a U-shaped, sloping bow to conform with the forward shape of the front of the vehicle: however, a V-shaped bow design may be utilized to provide less wind resistance during transit. The boat-roof is mounted upon a supporting lip which is secured around the perimeter of the original roof at the juncture of the sidewalls of the vehicle. The boat and vehicle body are secured by interiorly positioned latches which are secured to the supporting lip.

Removal of the boat is accomplished by disengaging the latches and positioning the gunwhale of the boat upon rollers positioned near the rear of the vehicle. The rollers are also affixed to the supporting lip on the interior of the assemblage and simply form a seat for rolling the boat off and on the vehicle.

After removal of the boat-roof, the vehicle may be driven as a convertible, or a top of canvas or other suitable materials may be secured across the opening. A tent may be erected, supported by and attached to the supporting lip, to yield essentially the same living space within the vehicle as was provided by the raised boat-roof. The vehicle may be more easily garaged during the "off" seasons when the boat is removed if necessary.

Thus it is an object of the present invention to provide a recreational vehicle with a duel purpose roof, that is, one which will provide added space within the vehicle and one which will also be demountable and be useful as a boat. It is further an object of the present invention to provide simplified means to adequately secure the boat and allow easy removal and to provide means to enclose the opening adequately when the boat is removed.

Further features and advantages will become apparent from the following drawings and descriptions corresponding thereto.

BRIEF DESCRIPTION OF THE DRAWINGS

FIG. 2 illustrates a cut-out cross-sectional view of the attachment means of the boat-roof and vehicle of FIG. 1, particularly illustrating the boat support lip and latching means.

FIG. 3 is a perspective cut-out view of the interior of the boat-roof structure as attached to the vehicle body of FIG. 1.

FIG. 4 specifically illustrates the latching means of FIG. 2 used and the relative movement thereof to release the boat-roof attachment of FIG. 1 to the vehicle body.

FIG. 5 illustrates the roller assembly used to mount and demount the boat-roof attachment of the present invention.

FIG. 8 illustrates a perspective view of an alternative embodiment of the invention to FIG. 1 where the boat-roof attachment is further raised out of the plane of the original roof.

DESCRIPTION OF THE DRAWINGS

Figure 1:
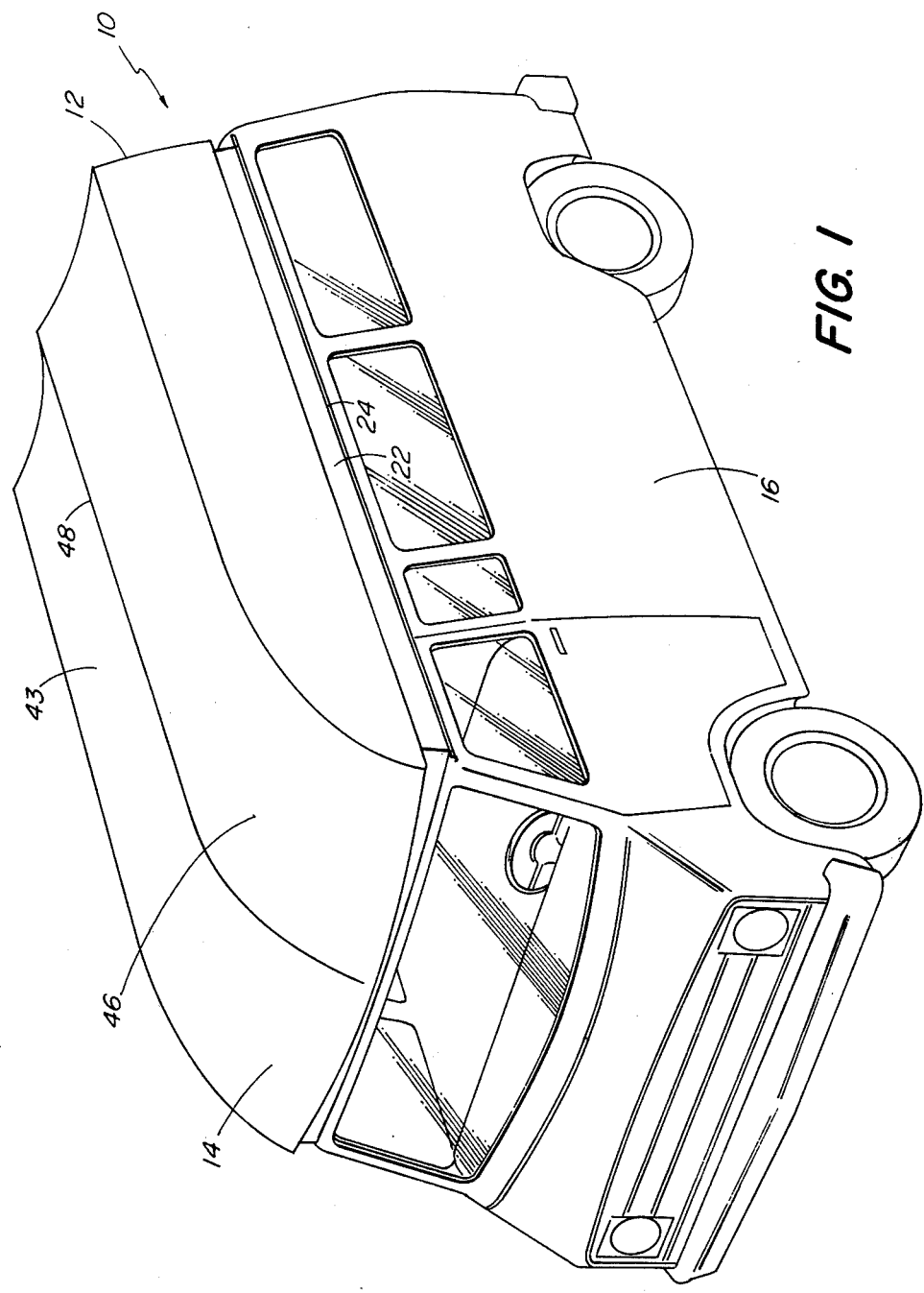
FIG. 1 illustrates an angular side perspective view of a van-type vehicle having the boat-roof structure attachment of the present invention affixed thereto.

Referring now to the drawings in detail and in particular to FIG. 1, reference numeral 10 generally designates a van-type recreational vehicle having a duel purpose boat-roof 12 securely affixed thereto. Boat-roof 12 (to be used interchangeably with the designation boat hull 12) may be constructed from any suitable material with the prime considerations being weight, durability and the ability to be water worthy. Weight of a typical boat-roof 12 should range from 90 to 150 pounds, thus it is possible for one or two persons to mount and demount boat-roof 12.

FIG. 1 further illustrates the preferred configuration of boat bow 14 and the relative placement of boat-roof 12 upon vehicle body 16. It should be noted that the original roof of the vehicle has been cut out and removed, the cut out portion of body 16 (roof) having a width and length slightly less than the width and length of boat roof 12. A portion of the original roof, reference numeral 18, FIG. 2, is maintained for support of boat-roof 12.

Referring now primarily to FIG. 2, a cross section view of original roof strip 18 and vehicle sidewall 120 are shown supporting inverted boat-roof 12 with the aid of boat-roof support lip 22 which acts as a wedge between these members. Wedging support lip 22 displaces boat-roof weight to vehicle side walls 20 and the related supporting and reinforcing members. Support lip 22 eliminates the need for further reinforcement to support the weight of boat-roof 12.

Since the original roofs of most van-type vehicles slope or have a curvature which terminates at side wall 20 in a drip rail channel or gutter 24, wedging support lip 22 has a lower sloping concave surface 26, which conforms to the original roof curvature, and merges with the outer surface of support lip 22 to form a narrow bottom edge 27 which rests in channel 24. Support lip 22 is affixed to original roof strip 18 by sheet metal screws 28, small nuts and bolts, rivets or other suitable means. A layer of caulking 29 should be interposed between these members.

Wedging lip 22 has an upper flat surface 30 upon which boat lip 32, displaced somewhat from gunwhale edge 34, rests. Weather stripping 36 may be placed upon support lip 22 to interface with boat lip 32. Outer support lip flat surface 38, being substantially parallel to sidewall 20, has a slight indentation upon its upper outer corner to which an adhesive strip 40, preferably a velcro strip, is attached. The velcro is primarily for tent attachment.

It should be noted that support lip 22 rests upon and continuously extends about the perimeter original roof 18 and is constructed preferably from fiberglass, heavy plastics or any suitable materials. Support lip 22 is approximately two to three inches thick at its inner surface 42 which communicates with the edge of the cut out portion of original roof strip 18. The width of support lip upper surface, upon which the similarly dimensioned boat lip rests, is approximately three to four inches. It can be readily observed that gunwhale edge 34 will protrude downward with respect to the perpendicular boat lip 32 for a short distance to secure a tight fit. Also a rubberized moulding strip could be affixed to the outer surface of gunwhale edge to cover support lip 22 and provide further weatherproofing.

Referring now exclusively to FIG. 1, the preferred squared or U-shaped and sloping boat bow 14 configuration is illustrated. Bow 14 is sloped for best wind resistance in transit. A V-shaped bow could be utilized, but should the bow protrude beyond the front of vehicle 10, the exposed V portion should be enclosed and fitted with floatation material and would attach to support lip 22 at the front of the vehicle. Boat bottom 43 may be of any suitable design but as illustrated bottom 43 has two longitudinal concave portions 46 merging in a central longitudinal raised portion 48. Boat structure 12 could be constructed in a double hull configuration with floatation material incorporated therein. Also a stern plate may be incorporated to provide a means for mounting a motor.

FIG. 3 illustrates a perspective cut out view of the interior of boat-roof 12 as attached to vehicle body 16. More particularly the positioning of latch means 50, demounting roller means 52, oar locks 54, and moveable boat seat means 56 are depicted.

As illustrated, six spaced latch means 50, more if desired, are contemplated to be used to secure boat-roof 12 to body 16, two latches on each side and one on each end. Demounting roller means 52 are placed approximately one foot from the rear of the assembly, one on each side of vehicle body 16. Both latches 50 and rollers 52 are secured to wedging support lip inner surface 42. Oar locks are secured to the oars. Only a metal seat 54 for receiving the oar lock pin, need be incorporated into the boat lip 32. A metal seat for receiving oar lock pins, will be positioned in boat lip 32 to accommodate the oars.

Boat bench seats 56 are illustrated latched to the bottom of boat hull 12 by clasping bracket means 58 to ensure ample head room when the boat is mounted and latched to body 16. Alternatively, seats 56 may be stored on the floor of the vehicle or be used as bench seats inside the vehicle. When boat hull 12 is demounted and in use, male brackets 60, upon the end edges of bench seat 56, slip onto female brackets 62 positioned upon the sides of boat hull 12. Of course seats 56 could be positioned longitudinally along the side wall of boat hull 12 if desired. A center seat support may also be desirable but not mandatory.

Referring again to FIG. 2, latch means 50 are further illustrated. A conventional type of latch may be used, such as those used for convertible car types. When opened, latch 50 must be able to be drawn completely out of the way of boat hull lip 32. Latch face 70 is appropriately secured by screws 72 or other means to wedging support lip inner edge 42. Groove 74 displaced slightly from the under edge of boat lip 32 receives and supplies a seat for the clasping armature portion 76 of latch 50. Latch armature 76 is allowed to be raised above boat lip 32 by means of pivoting on latch locking member 78; which in turn is pivoted on latch face 70.

FIG. 4, shows the relative movement of latch means 50 when readying boat hull 12 for removal. It is desired that groove 74 be angled or slanted inwards and thus be shaped like a parallelogram. Latch end clasping finger 80 will be similarly angled. A metal receiver may be inserted into groove 74 to strengthen boat lip 22 when pulling latch 50 closed.

Figures 6, 7:
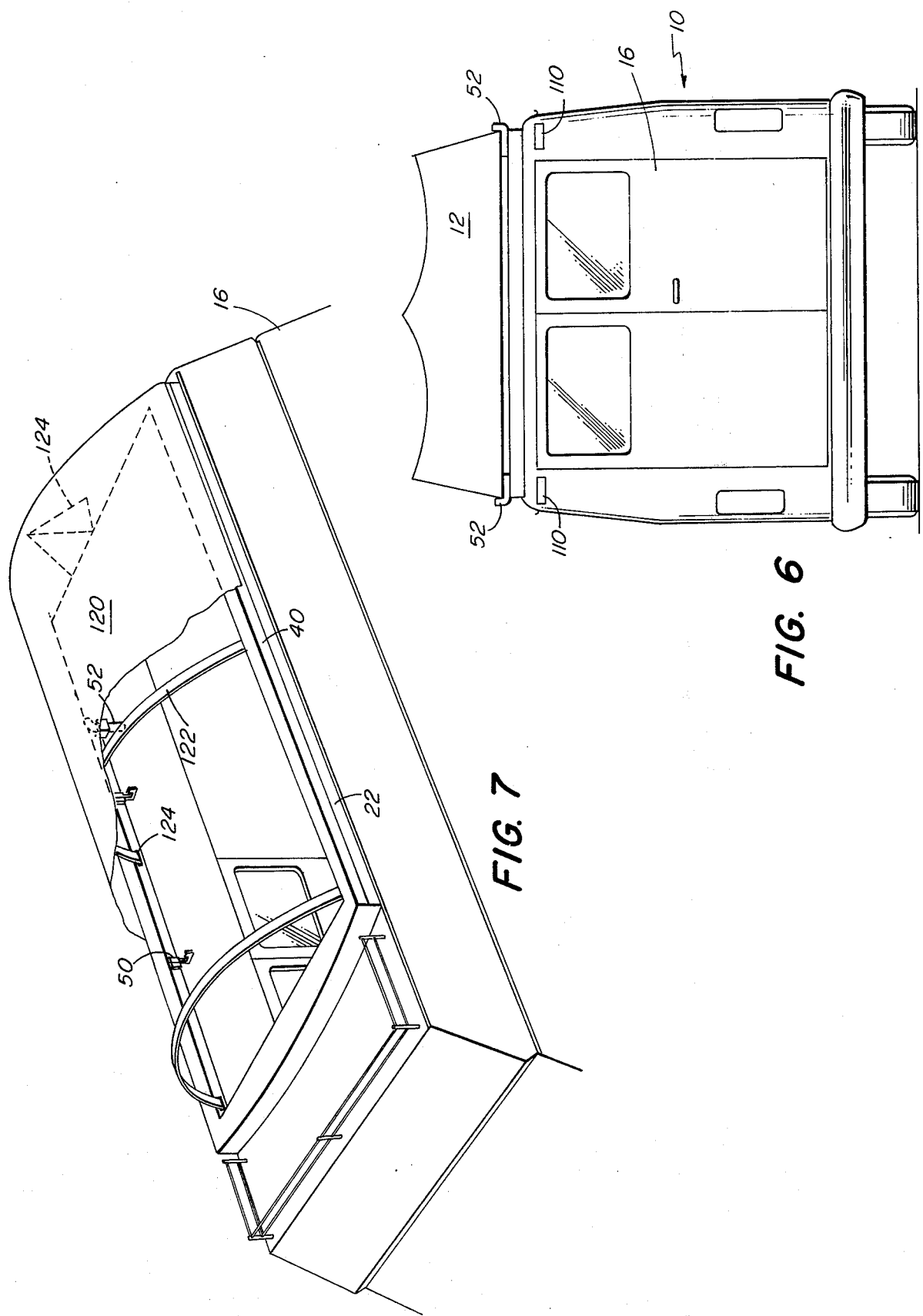
FIG. 6, by a view of the rear of the vehicle of FIG. 1, the means of removal of the boat-roof attachment from the vehicle by means of the roller assemblies of FIG. 5.
FIG. 7 is a perspective cut-away view illustrating an erected tent structure when the boat-roof attachment is removed.

Roller assemblies 52 are fully illustrated in FIG. 5. When boat hull 12 is unlatched and its stern raised slightly, interiorly mounted rollers assemblies 52 swing 90° to become a seat for gunwhale edge 34 of boat hull 12 (FIG. 6). Rectangular, tubular casing 90 is securely mounted on and extends slightly above wedging support lip inner edge 42. Each side 92 of casing 90, at its upper extent has a notch 94. Notched sides 92 allow roller 96 upon supporting roller arm 98 to be moved 90° from the illustrated seated position to be positioned parallel to support lip 22 when the boat is mounted. Since casing 90 extends slightly above support lip 22 and abuts boat lip 32 roller 96 will be supported slightly above wedging support lip weather striping 36 while in a perpendicular relation to support lip 22. Boat guide 102 forms the outer extent of roller arm 98 and is curved to extend vertically and to substantially form a perpendicular relation with arm 98. As illustrated, the inner portion 104 of roller arm 98 communicates with a perpendicular shaft 106 which extends within and snuggly abuts casing 90 to maintain roller assembly 52 in position during mounting and demounting of boat hull 12 and when roller arm 98 is resting in demounting notches 94. Roller 96 is seated upon bearings in or on roller arm 98 which could be encased in plastic tubing for economy. Shaft 106 could be eliminated if desired if notches 94 were enclosed apertures through which inner roller arm end 104 could be snuggly fitted and supported.

FIG. 6 illustrates a rear view of boat hull 12 unlatched raised and placed upon roller assembly 52, ready to be dismounted. To dismount boat hull 12, a person simply remains inside vehicle 10, raises the front of boat hull 12 near bow 14 and walks to the rear of vehicle 10 while pushing hull 12 upon the roller assembly. Bow 14 is raised and thus the stern is lowered to the ground. To replace the boat, one simply reverses this procedure. To facilitate replacement, a pair of rollers 110 could be placed on the rearward exterior of vehicle 10 to prevent damage to vehicle body 16 and aid in the initial lifting of boat hull 12.

FIG. 7 illustrates a cut out perspective view primarily illustrating conestoga type tent structure 120 constructed of canvas or nylon for use when boat-roof 12 is removed. Bendable wood or metal supports 122, three or four in number, support tent 120. Tent 120 overlaps the perimeter of boat support lip 22 and is secured thereto by a self-adhesive strip 40, such as velcro. The edge of tent 120 should also have a strip of velcro or similar substance which adheres to the support lip velcro strip; thus wind and moisture are effectively prevented from entering. Supports 122 will be substantially U-shaped when inserted into stationary latch brackets attached to support lip 22 or, as illustrated when inserted into holes 124 drilled in wedging support lip 22. Of course various tent designs could be used, however.

Ends 124 of tent 120 may have snap-type zippered flaps to allow air circulation. Should it be desired to use snaps rather than velcro to affix tent 120 to body 16, or to use both, such may be readily incorporated into the edges of tent 120 and the outer perimeter of support lip 22. When the tent top is not in use it may be rolled into a small package and easily stored along with the support poles.

When the boat and tent are removed, vehicle 10 may be driven as a "convertible" with the possible insertion of roll bars. A canvas, nylon, or similar top may be stretched across the opening and may be secured in the same manner as the tent. Also a fiberglass top could be latched in position by using the existing latch means.

FIG. 8 illustrates an alternative embodiment whereby boat support wall 130 is elongated to further raise boat hull 12 twelve or more inches higher from the original roof. Elongated support lip wall 130, extending above the plane of the original roof, would still be of one piece fiberglass (or other suitable material) construction extending around the perimeter of remaining original roof strip 18 and resting in rain gutter 24. Screws or rivets may secure support lip wall 130 to original roof strip 18. Sloping the forward section of support lip wall 130 to conform with boat bow slope will provide a contoured look and provide less wind resistance. Support lip wall 130 may extend over and enclose the driver compartment with boat-hull 12 covering only approximately the rear two-thirds of the vehicle especially in the large van models with the covered forward portion of the vehicle providing a base for luggage storage means 132. Windows 134 and ventilation means could be incorporated in support wall 130. It should be noted that the only difference in construction and attachment to vehicle of the assembly between support wall 130 and support lip 22, is the elongation.

From the foregoing it is obvious that the boat-roof and tent combination could be easily adapted to a pick-up truck, regular pull trailer, station wagon or deep bed trailer with minimal or no variation from the present disclosure. With respect to pick-up trucks, the typical hard to store and bulky metal and fiberglass "cap" attachments would be substituted for by the present invention, especially using the elongated support lip wall and tent to be used for camping, while providing greater versatility at a substantially reduced cost. Of course existing caps could be cut, a boat support lip secured and a boat roof of FIG. 1 substituted therefor.

The present invention thus pertains to a recreational vehicle attachment being a demountable boat-roof assembly positioned of out the plane of and in replacement of the original vehicle roof, the inventor does not wish to be strictly limited to the foregoing disclosure as adaptations may be made without departing from the spirit of the invention; thus the inventor wishes to be limited only by the scope of the following claims.

I claim:

1. A recreational vehicle boat-roof structure attachment situated in place of and out of the plane of the original vehicle roof wherein; after removal of substantially all of the original vehicle roof, a perimeter strip of said original roof remains which merges into a perimeter drip rail channel concavity comprising in combination:

a boat structure dimensioned to cover said vehicle roof area;
a boat lip extending around the perimeter of the gunwhale of said boat structure being in a perpendicular relation to and displaced a slight distance from the gunwhale edge;
a wedging boat support lip extending continuously about the perimeter of and resting upon said original roof strip, wedging boat said support lip having a concave lower surface, conforming to the slope of said original roof, and three flat surfaces, an outer surface and said concave surface merging into a narrow edge which rests in said drip rail channel concavity;
securing means to extend through said outer and concave wedging boat support lip surfaces into said original roof strip;
a layer of caulking substance between said original roof strip and said concave wedging boat support lip surface;
a continuous strip of weather stripping upon the upper surface of said wedging boat support lip;
a rectangular indentation within the upper corner of said outer surface of said wedging boat support lip;
a continuous strip of adhesive substance secured within said rectangular indentation;
latch means secured to the inner surface of said wedging boat support lip to attach to and secure said recreational vehicle boat-roof structure attachment to said vehicle; and
roller means secured to the inner surface of said wedging boat support lip, being placed near the rear of said vehicle to accommodate said gunwhale edge and to assist removal of said recreational vehicle boatroof structure attachment when moved 90° from the rest position.

2. The recreational vehicle boat-roof structure attachment of claim 1 wherein said recreational vehicle boat-roof structure attachment further including:
an angled groove on the underside of said boat lip to receive said latch means;
a sloping bow;
a bottom having longitudinally concave surfaces merging into a mediately positioned longitudinally raised portion;
provision for protruding oar locks below said boat lip;
provision for removable bench seats; and
provision for a stern plate to provide motor mounting.

3. The recreational vehicle boat-roof structure attachment of claim 2 further including a U-shaped bow conforming to the forward portion shape of said vehicle.

4. The recreational vehicle boat-roof structure attachment of claim 1 further including:
a V-shaped bow protruding beyond the forward portion of said vehicle and said wedging boat support lip; and
floatation material enclosing the exposed portion of said bow and secured to said wedging boat support lip.

5. The recreational vehicle boat-roof structure attachment of claim 1 wherein said recreational vehicle boat-roof structure attachment is comprised of fiberglass of unitary construction.

6. The recreational vehicle boat-roof structure attachment of claim 1 wherein said wedging boat support lip is constructed of fiberglass and is of unitary construction.

7. The recreational vehicle boat-roof structure attachment of claim 1 wherein the latch means further includes:
a latch face secured to said wedging boat support lip inner surface;
a clasping armature having a vertical portion, a transverse portion eminating therefrom and a clasping downward protruding angular finger capable of movement away from said boat lip whe unsecured; and
a locking member to secure said clasping armature to said boat lip.

8. The recreational vehicle boat-roof structure attachment of claim 1 wherein the roller means further includes:
a rectangular tubular casing mounted on said inner surface of said wedging boat support lip, extending slightly above said wedging boat support lip;
mediately positioned apertured notches on the upper edge of each side of said casing;
a tubular roller;
a support armature, extending through said roller to support said roller, curved and terminating at its outer extent in a perpendicular relation to form a guide for said boat gunwhale edge;
a shaft eminating perpendicularly from said roller arm, displaced slightly from the inner end of said roller arm, to fit snuggly within said casing to maintain said roller assembly in position whereby said roller support armature is maintained with said notches.

9. The recreational vehicle boat-roof structure attachment of claim 1 further including provision for erection of a tent of a suitable material in place of said recreational vehicle boat-roof structure attachment and out of the plane of said original roof comprising:
removable and bendable support members;
provision to mount said support members to the inner surface of said wedging boat support lip;
an adhesive-strip substance about the perimeter of said tent material to be attachable to said wedging boat support lip perimeter adhesive substance strip.

10. The recreational vehicle boat-roof structure attachment of claim 1 wherein said gunwhale boat edge about its inner perimeter snuggly abuts the outer surface of said wedging boat support lip.

11. The vehicle attachment of claim 1 wherein said demountable boat structure is comprised of a double hull design incorporating floatation material into said hull.

12. A vehicle attachment including a demountable boat structure situated in place of and out of the plane of the original vehicle roof, said demountable boat structure dimensioned to conform with and cover the removed roof area and to derive support from a remaining perimeter roof strip which terminates in a perimeter drip rail channel and communicates with the vehicle side wall, the elements comprising in combination:
a wedging boat support lip extending continuously about the perimeter of and resting upon said remaining original roof strip, said wedging boat support lip having a lower surface, conforming to the slope of said original roof, and three flat surfaces;

securing means to attach said wedging boat support lip to said original roof strip;

a rectangular indentation within the upper corner of the outer surface of said wedging boat support lip;

a continuous strip of adhesive substance secured within said rectangular indentation;

a continuous strip of weather stripping substance upon the upper surface of said wedging boat support lip;

a layer of caulking substance between said original roof strip and said sloping wedging boat support lip lower surface;

latch means secured to the inner surface of said wedging boat support lip to secure said boat structure and said vehicle, said latches capable of allowing removal of said boat structure without interference when unsecured; and roller means secured to the inner surface of said wedging boat support lip capable of ninety degree movement to allow communication of roller members with the gunwhale edge of said boat during demounting of said boat structure.

13. The vehicle attachment including a demountable boat structure of claim 12 further including a boat lip displaced somewhat from and perpendicular to the gunwhale edge of said boat structure, extending about the perimeter thereof, one surface communicating with and resting upon said wedging boat support lip, said boat lip having provision to accept said securing latches and said gunwhale further snuggly abutting said outer surface of said wedging boat support lip.

14. The vehicle attachment of claim 13 wherein the provision for acceptance of said securing latch means is an angled groove having metal receivers therein.

15. The vehicle attachment of claim 12 wherein said outer surface and said sloping surface merge forming a distinct narrow edge which rests in said drip rail channel concavity.

16. The vehicle attachment of claim 12 wherein said wedging boat support lip is further being elongated with respect to its height dimension to add greater height to said vehicle.

17. The vehicle attachment of claim 12 wherein said wedging boat support lip is constructed from fiberglass.

* * * * *